United States Patent
Hasuo et al.

(10) Patent No.: US 6,716,513 B1
(45) Date of Patent: Apr. 6, 2004

(54) HYDROPHILIC MEMBER, METHOD FOR PREPARATION THEREOF, AND COATING AGENT AND APPARATUS FOR PREPARATION THEREOF

(75) Inventors: Hiroto Hasuo, Kitakyushu (JP); Yoshiyuki Nakanishi, Kitakyushu (JP); Hideki Kobayashi, Kitakyushu (JP); Takayuki Kato, Kitakyushu (JP)

(73) Assignee: Toto Ltd., Fukuoka-ken (JP)

( * ) Notice: Subject to any disclaimer, the term of this patent is extended or adjusted under 35 U.S.C. 154(b) by 0 days.

(21) Appl. No.: 09/936,136

(22) PCT Filed: Mar. 9, 2000

(86) PCT No.: PCT/JP00/01438
§ 371 (c)(1),
(2), (4) Date: Sep. 7, 2001

(87) PCT Pub. No.: WO00/53689
PCT Pub. Date: Sep. 14, 2000

(30) Foreign Application Priority Data

| | | |
|---|---|---|
| Mar. 9, 1999 | (JP) | 11/61482 |
| May 21, 1999 | (JP) | 11/141522 |
| Sep. 1, 1999 | (JP) | 11/247083 |
| Jan. 12, 2000 | (JP) | 2000/3886 |

(51) Int. Cl.[7] .............................................. B32B 17/00
(52) U.S. Cl. .................... 428/141; 428/143; 428/148; 428/149; 428/323; 428/330; 428/331
(58) Field of Search ................. 428/141, 143, 428/148, 149, 428, 429, 323, 330, 331, 328

(56) References Cited

U.S. PATENT DOCUMENTS 6,013,372 A  1/2000  Hayakawa et al. ...... 428/411.1
6,071,623 A * 6/2000  Sugawara et al. .......... 428/428
6,156,409 A  12/2000  Doushita et al. ............ 428/143

FOREIGN PATENT DOCUMENTS

| EP | 0816466 | 1/1998 | |
| EP | 0869156 | 10/1998 | |
| JP | 53(1978)-98324 | 8/1978 | ........... C04B/41/32 |
| JP | 56(1981)-121661 | 9/1981 | ............ B05D/3/00 |
| JP | 08(1996)-188442 | 7/1996 | ............. C03C/3/04 |
| JP | 8267646 | 10/1996 | |
| JP | 9227805 | 9/1997 | |

(List continued on next page.)

OTHER PUBLICATIONS

International Preliminary Examination Report dated Jun. 5, 2001, for PCT/JP00/01438, International Filing Date Mar. 9, 2000.

(List continued on next page.)

Primary Examiner—Harold Pyon
Assistant Examiner—Alicia Chevalier
(74) Attorney, Agent, or Firm—Jones Day

(57) ABSTRACT

A hydrophilic material comprises a substrate and a hydrophilic layer provided as the outermost layer on the substrate. The hydrophilic layer comprises hydrophilic metal oxide particles and a hydrophilic inorganic amorphous material. The hydrophilic layer has profile peaks on its surface. The hydrophilic layer has roughness properties such that, when a segment is set in only a portion not containing the profile peaks, the ten-point mean roughness (Rz) and the mean distance between concaves and convexes (Sm) obtained from a profile curve in the segment are $10\ nm \leq Rz \leq 40\ nm$ and $10\ nm \leq Sm \leq 300\ nm$, respectively, while, when a segment is set so as to pass through the profile peaks, the ten-point mean roughness (Rz) and the mean distance between concaves and convexes (Sm) obtained from a profile curve in the segment are $40\ nm \leq Rz \leq 200\ nm$ and $300\ nm \leq Sm \leq 500\ nm$, respectively.

41 Claims, 4 Drawing Sheets

FOREIGN PATENT DOCUMENTS

| | | | |
|---|---|---|---|
| JP | 9227832 | 9/1997 | |
| JP | 09(1997)-278431 | 10/1997 | ........... C01B/33/26 |
| JP | 10195380 | 7/1998 | |
| JP | 10195382 | 7/1998 | |
| JP | 10237357 | 9/1998 | |
| JP | 10237431 | 9/1998 | |
| JP | 10211680 | 11/1998 | |
| JP | 10296902 | 11/1998 | |
| JP | 10315374 | 12/1998 | |
| JP | 11(1999)-100234 | 4/1999 | ........... C03C/17/23 |
| JP | 11(1999)-217560 | 8/1999 | ............ C09K/3/18 |

OTHER PUBLICATIONS

JPO Abstract 56(1981)–121661, Sep. 24, 1981.
JPO Abstract 08(1996)–188442, Jul. 23,1996.
JPO Abstract 09(1997)–278431, Oct. 28, 1997.
JPO Abstract 11(1999)–217560, Aug. 10, 1999.

* cited by examiner

HYDROPHILIC MEMBER, METHOD FOR PREPARATION THEREOF, AND COATING AGENT AND APPARATUS FOR PREPARATION THEREOF

This application claims the benefit of International Application No. PCT/JP00/01438, which has the international filing date of Mar. 9, 2000, and which was not published under PCT Article 21(2) in English.

BACKGROUND OF THE INVENTION

1. Field of the Invention

The present invention relates to a material having a hydrophilic surface, and more particularly to a hydrophilic material for use, for example, as glasses, mirrors, reflector plates, and protective plates, where antifogging properties and antifouling properties are required, and to a process, a coating composition and an apparatus for producing the same.

2. Background Art

When the temperature is brought to the dew point or below, the moisture in the air condenses and, consequently, fog is likely to occur on the surface of transparent materials, such as glasses and plastics, reflecting materials, such as mirrors and metal plates, and other materials, such as materials having a design on the surface thereof, Further, upon the deposition of rainwater or water spray on the surface of these materials, the water is likely to deposit as water droplets rather than as a water layer. Thus, the presence of fog or water droplets on the surface of materials often makes it impossible to exhibit functions inherent in the materials, or deteriorates the appearance and design of the materials due to scattering of light.

The following techniques are known to render the surface of the substrate hydrophilic to solve the problem of such fogging and the scattering of light.

Japanese Patent Laid-Open No. 278431/1997 discloses a method for forming profile irregularities (concaves and convexes) on the surface of a substrate, comprising the steps of: coating a surface treating agent comprising phosphoric acid or its salt, a soluble aluminum compound, a water-soluble silicate, a surfactant, and a solvent; and heat treating the coating at 300 to 700° C.

Japanese Patent Laid-Open No. 100234/1999 discloses a method for forming profile irregularities, wherein a layer is formed which comprises metal oxide particles having a particle diameter of 3 to 300 nm and a metal oxide and has profile peaks having an arithmetic mean roughness (Ra) of 1.5 to 80 nm and a mean distance between concaves and convexes (Sm) of 4 to 300 nm.

SUMMARY OF THE INVENTION

The present inventors have now found that the regulation of the surface state of a hydrophilic material can provide a hydrophilic material having excellent antifogging properties without sacrificing the layer hardness and endurance properties.

Accordingly, it is an object of the present invention to provide a hydrophilic material which, while maintaining satisfactory layer hardness and endurance properties, is less likely to fog and is less likely to cause the deposition of water droplets and soils or stains thereon.

According to a first aspect of the present invention, there is provided a hydrophilic material comprising at least a substrate and a hydrophilic layer provided as the outermost layer on the substrate, the hydrophilic layer comprising at least hydrophilic metal oxide particles and a hydrophilic inorganic amorphous material, the hydrophilic layer having on its surface profile peaks, the hydrophilic layer having roughness properties such that, when a segment is set in only a portion not containing the profile peaks, the ten-point mean roughness (Rz) and the mean distance between concaves and convexes (Sm) obtained from a profile curve in the segment are $10\ \text{nm} \leq Rz \leq 40\ \text{nm}$ and $10\ \text{nm} \leq Sm \leq 300\ \text{nm}$, respectively, while, when a segment is set so as to pass through the profile peaks, the ten-point mean roughness (Rz) and the mean distance between concaves and convexes (Sm) obtained from a profile curve in the segment are $40\ \text{nm} \leq Rz \leq 200\ \text{nm}$ and $300\ \text{nm} \leq Sm \leq 1500\ \text{nm}$, respectively.

According to a second aspect of the present invention, there is provided a hydrophilic material comprising at least a substrate, a first hydrophilic layer provided on the substrate and consisting essentially of a hydrophilic inorganic amorphous material and hydrophilic metal oxide particles, and a second hydrophilic layer provided as the outermost layer on the first hydrophilic layer and consisting essentially of a hydrophilic inorganic amorphous material.

DETAILED DESCRIPTION OF THE INVENTION

Definition

Figure 1:
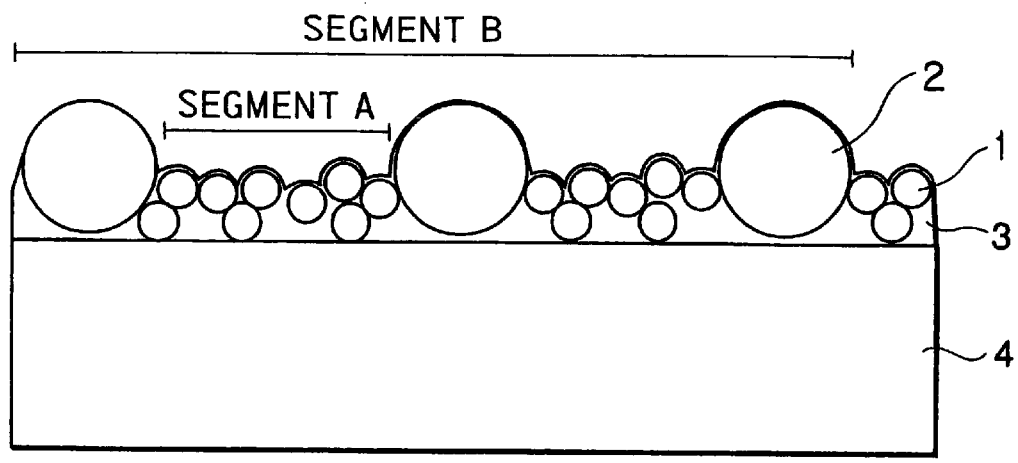
FIG. 1 is a conceptual cross-sectional view of a hydrophilic material according to the first aspect of the present invention, wherein the hydrophilic material comprises a substrate 4 and, provided on the substrate 4, a hydrophilic layer comprising first hydrophilic metal oxide particles 1, second hydrophilic metal oxide particles 2, and a hydrophilic inorganic amorphous materials 3.

In the present invention, the term "ten-point mean roughness (Rz)" is a parameter defined in JIS B 0601 (1994) and is a value obtained by setting a segment within a measured region and determining a difference between the mean value of absolute values ($R_1$, $R_3$, $R_5$, $R_7$, and $R_9$) of the altitudes of five highest profile peaks and the mean value of absolute values ($R_2$, $R_4$, $R_6$, $R_8$, and $R_{10}$) of the altitudes of five deepest profile valleys measured in an area of 5 μm×5 μm square utilizing a profile curve in the segment. This value is determined by the following equation. The length of the segment set in this case is not particularly limited. If possible, however, a long segment is set in consideration of a variation in Rz. The above JIS (Japanese Industrial Standards), together with English translation thereof, are easily available from Japanese Standards Association (1–24, Akasaka 4-chome, Minato-ku, Tokyo, Japan).

$$Rz = \frac{(R_1 + R_3 + R_5 + R_7 + R_9) - (R_2 + R_4 + R_6 + R_8 + R_{10})}{5}$$

Further, in the present invention, the "mean distance between concaves and convexes (Sm)" is a parameter defined in ISO. A roughness curve of an evaluation length, which is N times a sampling length equal to the cut-off value, is divided into N equal parts. The mean value Sm' of distances between concaves and convexes (horizontal width $Sm_i$ between a set of profile peak and valley adjacent to each other) in each section is determined by the following equation, and Sm is determined as the arithmetic mean value of NSm'.

$$Sm' = \frac{1}{n}\sum_{i=1}^{n} Smi$$

Further, in the present invention, the "surface roughness" can be obtained by the face expansion of center line average roughness (Ra). Here the "center line average roughness (Ra)" is a parameter defined in JIS B 0601 (1994), and is a value obtained by the following equation when sampling only the measuring length 1 from the roughness curve in the direction of center line, taking X-axis in the direction of center line and Y-axis in the direction of longitudinal magnification of this sampled part and, in addition, expressing the roughness curve by Y=f(x):

$$R_a = \frac{1}{l}\int_0^l |f(x)|\,dx$$

The ten-point mean roughness (Rz), the mean distance between concaves and convexes (Sm), and the surface roughness may be determined by measuring the form of the surface in its area of 5 μm×5 μm at any part of the layer under an atomic force microscope.

Hydrophilic Material

In both the first and second aspects of the present invention, the hydrophilic material according to the present invention basically comprises at least a substrate and a hydrophilic layer provided on the substrate.

(a) Substrate

In the present invention, the substrate means articles, which are expected to have antifogging, antifouling, and hydrophilic effects, and materials usable for the substrate include inorganic materials, metallic materials, organic materials, or composites of these materials. Examples of preferred substrates include articles which are required to have antifogging and antifouling properties, for example, building materials and daily necessities, such as tiles, sanitary wares, tablewares, glasses, mirrors, reflector plates, protective plates, protective films, ceramic wares, calcium silicate boards, cements, woods, resins, metals, and ceramics. Examples of more preferred substrates include: transparent materials, such as glasses and glass covers; mirrors and reflector plates required to have the function of reflecting light; and protective plates, protective films, and films required to permit light to pass therethrough.

More specific substrate applications include: mirrors, such as rearview mirrors for vehicles, side-view mirrors for vehicles, bathroom mirrors, lavatory mirrors, dental mouth mirrors, and reflecting mirrors for roads; lenses, such as eyeglass lenses, optical lenses, lenses for cameras, lenses for endoscopes, lighting lenses, lenses for semiconductors, and lenses for copying machines; prisms; windowpanes for building or watchtower; windowpanes for vehicles, such as automobiles, railway vehicles, aircrafts, watercrafts, submarines, snow cars, ropeway gondolas, pleasure garden gondolas, and spacecrafts; windshields for vehicles, such as automobiles, railway vehicles, aircrafts, watercrafts, submarines, snow cars, snowmobiles, motorbicycles, ropeway gondolas, pleasure garden gondolas, and spacecrafts; goggles for protection, goggles for sports, shields of masks for protection, shields of masks for sports, shields of helmets, and glasses of display case for frozen foods; and cover glasses for measuring instruments. In particular, materials for bathrooms, which are one of applications where fogging is most likely to occur, are preferred, and mirrors for bathrooms are most preferred.

(b) Hydrophilic Layer

The hydrophilic layer according to the present invention comprises at least a hydrophilic inorganic amorphous material and hydrophilic metal oxide particles.

(i) Hydrophilic Inorganic Amorphous Material

In the present invention, the hydrophilic inorganic amorphous material is an inorganic amorphous material which can form chemically adsorbed water on its surface and can exhibit hydrophilicity. Such materials are preferably amorphous metal oxides. Additional examples of such materials include polysilazanes.

According to a preferred embodiment of the present invention, the hydrophilic inorganic amorphous material comprises at least one member selected from the group consisting of alkali silicates, alkali borosilicates, alkali zirconates, and metal phosphates, such as alkali phosphates. These materials, when water is present, easily form a chemically adsorbed water layer and can exhibit a high level of hydrophilicity for a long period of time. Among the above materials, alkali silicates are preferred. The hydrophilic inorganic amorphous material is more preferably at least one member selected from the group consisting of sodium silicate, potassium silicate, lithium silicate, and ammonium silicate. In general, it is considered that the adhesion is higher in the order of sodium silicate and potassium silicate while the water resistance is higher in the order of ammonium silicate and lithium silicate. When layer properties, layer hardness, water resistance and the like are taken into consideration, however, the incorporation of lithium silicate is more preferred.

According to a preferred embodiment of the present invention, the layer of the hydrophilic material according to the present invention may contain boric acid and/or a boric acid compound. The incorporation of boric acid and/or a boric acid compound can improve the water resistance and chemical resistance properties of the layer. Examples of preferred boric acid or boric acid compounds include orthoboric acid, metaboric acid, tetraboric acid, zinc borate, potassium borate, sodium borate, barium borate, magnesium borate, lithium borate, and boric ester.

According to a preferred embodiment of the present invention, the layer of the hydrophilic material according to the present invention may contain phosphoric acid and/or a phosphoric acid compound. The incorporation of phosphoric acid and/or a phosphoric acid compound can accelerate the hardening of the layer and can improve the endurance properties of the layer. Examples of preferred phosphoric acid or phosphoric acid compounds include phosphoric anhydride, metaphosphoric acid, pyrophosphoric acid, orthophosphoric acid, triphosphoric acid, tetraphosphoric acid, zinc phosphate, zinc hydrogenphosphate, aluminum phosphate, aluminum hydrogenphosphate, ammonium phosphate, ammonium hydrogenphosphate, sodium ammonium hydrogenphosphate, potassium phosphate, potassium hydrogenphosphate, calcium phosphate, calcium hydrogenphosphate, sodium phosphate, lithium hydrogenphosphate, and phosphoric ester.

According to a preferred embodiment of the present invention, a precursor of a material, which, upon heat treatment, is converted to $ZrO_2$, can be incorporated into the layer of the hydrophilic material according to the present invention. This permits zirconium to be incorporated into an $SiO_2$ structure in the alkali silicate to improve chemical resistance properties. Examples of preferred precursors of materials, which, upon heat treatment, are converted to $ZrO_2$, include zirconium chloride oxide, zirconium oxychloride, zirconium chloride, zirconium nitrate, zirconium acetylacetonate, zirconium butoxide, and zirconium propoxide.

(ii) Hydrophilic Metal Oxide Particles

In the present invention, a preferred example of the hydrophilic metal oxide particles comprises at least one member selected from the group consisting of $SiO_2$, $Al_2O_3$, $ZrO_2$, $TiO_2$, and $SnO_2$. These hydrophilic metal oxide particles are easily available and exhibit a high level of hydrophilicity. In particular, $TiO_2$ can decompose water to generate active oxygen species and can decompose organic matter and thus can expect to have excellent antifouling effect. $Al_2O_3$ strongly holds on its surface an adsorbed water layer and thus enables a high level of hydrophilicity to be maintained. $SiO_2$ may be used as colloidal silica, $Al_2O_3$ as alumina sol, $ZrO_2$ as zirconia sol, $TiO_2$ as titania sol, and $SnO_2$ as tin oxide sol. These are on the market and are easily available. In addition to the above materials, any particles, for example, particles of nitrides, borides, and carbides, may be used so far as an oxide can be formed on at least the surface of the particles.

The particles may be in various forms, such as spherical, rectangular, flat plate, feather, and chain forms. Preferred is a spherical or rectangular form because a concave-convex structure can be easily formed.

Hydrophilic Material According to First Aspect of Present Invention

According to the first aspect of the present invention, the surface of the hydrophilic layer (b) has a relatively smooth portion and a portion which has risen as compared with the smooth portion, that is, a profile peak portion. When a segment is set in the smooth portion, that is, only a portion not containing the profile peaks (segment A in FIG. 1), Rz (ten-point mean roughness) and Sm (mean distance between concaves and convexes) obtained from a profile curve in the segment are 10 nm$\leq$Rz$\leq$40 nm and 10 nm$\leq$Sm$\leq$300 nm, respectively, while, when a segment is set so as to pass through the profile peaks (segment B in FIG. 1), Rz (ten-point mean roughness) and Sm (mean distance between concaves and convexes) obtained from a profile curve in the segment are 40 nm$\leq$Rz$\leq$200 nm and 300 nm$\leq$Sm$\leq$1500 nm, respectively.

The surface of the hydrophilic material according to the first aspect of the present invention exhibits a high level of hydrophilicity such that a water layer is rapidly formed under wet conditions. For example, when a mirror as the hydrophilic material according to the present invention is provided in a bathroom, upon the adherence of steam or water spray on the surface of the mirror, the hydrophilic layer as the outermost surface continues to hold the adhered water as a water layer. In this state, the water layer on the hydrophilic layer can remain held even in the case where the surface temperature is the dew-point temperature or below, so far as water vapor comes into contact with the surface of the hydrophilic layer, or so far as water droplets are adhered by the adherence of water spray.

Since the water layer formed on the hydrophilic layer is homogeneous, light is linearly passed through the water layer without being scattered. Fogging of a mirror or a glass refers to a phenomenon such that the adhered water becomes fine water droplets which are adhered onto the surface and thus scatter light. In the hydrophilic material according to the present invention, the adhered water is brought to a homogeneous water layer rather than water droplets. Therefore, this "fogging" phenomenon does not take place. The adhered water is sometimes brought to relatively large water droplets rather than fine water droplets. These large water droplets distort an image reflected in the mirror. Further, in the transparent glass, these large water droplets distort an image seen through the transparent glass. The hydrophilic material according to the present invention does not form such relatively large water droplets and thus does not cause distortion of the image, that is, exhibits an excellent antifogging property. When water has been excessively adhered, water flows down. Since, however, the hydrophilic layer on the substrate continues to hold the water layer on a certain level, the antifogging property can be maintained.

Further, this homogeneous water layer makes it difficult for contaminants to come into direct contact with the surface of the substrate. Therefore, soil is less likely to deposit onto the substrate. That is, the hydrophilic material according to the present invention has also an excellent antifouling property. For example, the hydrophilic material according to the present invention can prevent the deposition of metal soap or rinse component in an bathroom environment, and can prevent the deposition of urban soot and dust in the open in the case of building materials such as outer walls.

According to a preferred embodiment of the present invention, the hydrophilic metal oxide particles comprise first hydrophilic metal oxide particles having a particle diameter distribution with the mode of particle diameter being 3 to 40 nm (preferably 10 to 30 nm) and second hydrophilic metal oxide particles having a particle diameter distribution with the mode of particle diameter being 40 to 300 nm (preferably 40 to 100 nm). That is, hydrophilic metal oxide particles having the above two types of particle diameter ranges are used in combination. By virtue of this, the above-described Rz and Sm requirements can be relatively easily satisfied.

FIG. 1 is a schematic cross-sectional view of one embodiment of the hydrophilic material according to the first aspect of the present invention. In the hydrophilic layer shown in FIG. 1, the Rz and Sm requirements are satisfied by first hydrophilic metal oxide particles 1, second hydrophilic metal oxide particles 2, and a hydrophilic inorganic amorphous material 3. As shown in FIG. 1, the surface of the hydrophilic material according to the first aspect of the present invention is such that large and small concaves and convexes are provided on the surface of a substrate 4. These large and small concaves and convexes are considered to increase the surface area of the hydrophilic layer and consequently to maximize the hydrophilicity of the surface of the hydrophilic layer. That is, it is considered that a water layer is easily formed on the surface of the hydrophilic material and, at the same time, a satisfactory amount of water layer can be evenly held on the surface of the hydrophilic material. Further, it is considered that the adhered water droplets are attracted toward tall portions in the concaves and convexes to accelerate the spread of the water layer.

According to a preferred embodiment of the present invention, the zeta potential at pH=7 of the surface of the hydrophilic layer is −40 to 40 mV, more preferably −30 to 30 mV. Regulating the zeta potential to a range close to zero can effectively prevent the deposition of charged soil. For example, the regulation of the zeta potential can suppress the deposition of cationic surfactants contained as a main component of a rinse and anionic surfactants contained in a shampoo caused within a bathroom, can prevent a lowering in hydrophilicity or the development of water repellency, and thus can realize the retention of the antifogging property for a longer period of time. The zeta potential is further preferably brought to −25 to 0 mV. In this case, the deposition of negatively charged soil, such as silica or clayey inorganic materials, can be effectively prevented. This is advantageous when the hydrophilic material according to the present invention is utilized in the open exposed to dust in the air and exhaust gas of automobiles.

According to a preferred embodiment of the present invention, the surface roughness in an area of any 5 $\mu$m square of the surface in the hydrophilic layer is 5 to 30 nm. When the surface roughness falls within this range, the antifogging effect and a high level of water layer holding capacity attained by the improved wettability and the transparency and the endurance properties can be further improved.

According to a preferred embodiment of the present invention, the static contact angle of the hydrophilic layer with water is not more than 35 degrees. This permits the water layer to be efficiently formed upon the deposition of water droplets, and, thus, the antifogging property can be improved. Bringing the static contact angle of the hydrophilic layer with water to not more than 20 degrees is more preferred because the water layer can be rapidly formed. In the case of stains or soils having relatively low polarity, such as greasy stains and soils generated, for example, from exhaust gas, a contact angle of not more than 35 degrees suffices for easily removing these stains or soils, for example, by rainwater. The contact angle is further preferably not more than 20 degrees.

According to a preferred embodiment of the present invention, the hydrophilic metal oxide particles comprise both hydrophilic metal oxide particles having positive charges and hydrophilic metal oxide particles having negative charges. This constitution can realize the above zeta potential and water contact angle. Hydrophilic metal oxide particles having positive charges include: those having a positive zeta potential at pH 7, for example, MgO, $La_2O_3$, ZnO, $\alpha$-$Fe_2O_3$, $Y_2O_3$, $\alpha$-$Al_2O_3$, and $\gamma$-$Al_2O_3$; and those having a negative zeta potential at pH 7, for example, $Cr_2O_3$, $CeO_2$, $ZrO_2$, $\gamma$-$Fe_2O_3$, FeO, $Fe_3O_4$, $TiO_2$, $SnO_2$, $MnO_2$, $SiO_2$, and $Sb_2O_5$. Among them, MgO, $Al_2O_3$, ZnO, $ZrO_2$, $TiO_2$, $Fe_2O_3$, and $SnO_2$ are preferred because they have a high level of hydrophilicity. Further, composite oxides of $SiO_2$, $A_2O_3$, $TiO_2$, $ZrO_2$, MgO, $SnO_2$, ZnO, $B_2O_3$, CdO, PbO and the like are mainly strongly acidic, and are effective as materials having a positive zeta potential.

Coating Composition

A coating composition suitable for the formation of a hydrophilic layer according to the first aspect of the present invention comprises at least a solvent and first hydrophilic metal oxide particles and second hydrophilic metal oxide particles as solutes.

Examples of preferred solvents include water and alcohols. Water is particularly preferred from the viewpoints of hydrophilicity and safety.

According to a preferred embodiment of the present invention, the coating composition may further contain a precursor of the hydrophilic inorganic amorphous material as an additional solute. The precursor of the hydrophilic inorganic amorphous material is a material which, upon the removal of the solvent and optional heat treatment, is converted to the above-described hydrophilic inorganic amorphous material (i), and a preferred example of the precursor is at least one member selected from the group consisting of alkali silicates, alkali borosilicates, alkali zirconates, and metal phosphates, such as alkali phosphates. Among them, alkali silicates are more preferred from the viewpoints of layer forming property and hydrophilicity.

According to a preferred embodiment of the present invention, the weight ratio of the amount of $SiO_2$ in the alkali silicate to the hydrophilic metal oxide particles is in the range of 10:1 to 1:4, and the weight ratio of the amount of the first hydrophilic metal oxide particles to the amount of the second hydrophilic metal oxide particles is in the range of 40:1 to 1:4.

Here according to the present invention, the hydrophilic layer may also be formed in two stages wherein upper and lower layers are formed in these respective stages. In this case, the hydrophilic layer may be such that the composition of the final layer contains the first and second hydrophilic metal oxide particles and the alkali silicate. For example, the coating composition to be coated as the lower layer may not contain the precursor of the hydrophilic inorganic amorphous material. In this case, preferably, in the coating composition to be coated to form the lower layer, the weight ratio of the amount of $SiO_2$ in the alkali silicate to the hydrophilic metal oxide particles is in the range of 10:1 to 1:4, and the weight ratio of the amount of the first hydrophilic metal oxide particles to the amount of the second hydrophilic metal oxide particles is in the range of 40:1 to 1:4, while, in the coating composition to be coated to form the upper layer, the weight ratio of the amount of $SiO_2$ in the alkali silicate to the hydrophilic metal oxide particles is in the range of 20:1 to 1:2.

According to a preferred embodiment of the present invention, various optional ingredients, which may be added to the hydrophilic layer, may be added to the coating composition. For example, both hydrophilic metal oxide particles having positive charges and hydrophilic metal oxide particles having negative charges may be incorporated as the first and/or second hydrophilic metal oxide particles. Further, at least one member selected from the group consisting of boric acid, boric acid compounds, phosphoric acid, phosphoric acid compounds, and precursors of materials, which, upon heat treatment, are converted to $ZrO_2$, may be further incorporated as the solute.

Production Process

The hydrophilic material according to the first aspect of the present invention may be produced through the step of coating the above coating composition onto a substrate to form a hydrophilic layer.

According to another aspect of the present invention, the hydrophilic material may be produced through the step of coating the above coating composition onto a substrate to form a first hydrophilic layer and the step of further coating a solution of an alkali silicate or the above coating composition onto the first hydrophilic layer to form a second hydrophilic layer.

The method for coating the coating composition is not particularly limited, and examples thereof include spray coating, flow coating, spin coating, dip coating, and roll coating. Although the optimal mixture concentration varies depending upon coating methods, according to these coating methods, coating followed by drying can form a layer. Therefore, these coating methods are not considered to have an influence on the form of concaves and convexes in the hydrophilic layer so far as the ratio of the ingredients is not changed.

According to a preferred embodiment of the present invention, the layer formed from the coating composition may be heat treated. In this case, the surface temperature of the layer is more preferably brought to 80 to 500° C. Bringing the surface temperature of the layer to this temperature range can satisfy water resistance requirement, while preventing a lowering in hydrophilicity caused by the stabilization of the structure in the surface of the inorganic material.

Hydrophilic Material According to Second Aspect of Present Invention

According to the second aspect of the present invention, the hydrophilic layer (b) comprises at least a first hydrophilic layer consisting essentially of a hydrophilic inorganic amorphous material and hydrophilic metal oxide particles and a second hydrophilic layer provided as the outermost layer on the first hydrophilic layer, said second hydrophilic layer consisting essentially of a hydrophilic inorganic amorphous material.

In this two-layer construction, concaves and convexes, which are optimal for ensuring the antifogging property, are first formed by hydrophilic metal oxide particles contained in the first hydrophilic layer on the surface of the hydrophilic material. Next, the second hydrophilic layer not containing hydrophilic metal oxide particles is formed as the outermost layer. This permits the highest level of hydrophilicity possessed by the hydrophilic inorganic amorphous material to be exhibited. That is, it is considered that excellent antifogging property and antifouling property can be realized by regulating the form of concaves and convexes in the hydrophilic layer by the first hydrophilic layer and enhancing the hydrophilicity by the second hydrophilic layer.

According to a preferred embodiment of the present invention, water is adhered onto the second hydrophilic layer, and this layer is vertically held to remove excess water to bring the weight of the water layer adhered onto the hydrophilic layer to 0.25 to 0.50 g per 10 $cm^2$, more preferably 0.25 to 0.35 g per 10 $cm^2$. Bringing the weight of the water layer to this range can form a homogenized, even, and satisfactory water layer on the surface of the hydrophilic layer, and, thus, an excellent antifogging property can be exhibited. At the same time, high hardness can be realized, and, thus, excellent endurance properties can also be provided. This weight of water layer can be realized by properly combining the first hydrophilic layer with the second hydrophilic layer.

Here the weight of the water layer is specifically measured as follows. At the outset, an environment of temperature 15 to 25° C. (room temperature) and relative humidity 30 to 80% is provided. The hydrophilic material is previously stabilized in this environment for one hr or longer, and the mass (X g) of the stabilized hydrophilic material is measured with a balance. After the measurement, the material is disposed so that the hydrophilic surface is rendered substantially vertical. Only the hydrophilic layer is wetted with water, of which the temperature has been made substantially equal to room temperature (15 to 25 degrees), to confirm that the whole hydrophilic layer has been wetted to form a water layer. 15 sec after the wetting of the hydrophilic layer, water reservoired at the bottom is removed, and the weight (Y g) of the whole hydrophilic material is measured with a balance. When the area of the hydrophilic surface of the material used is Z ($cm^2$), the amount of water per 10 $cm^2$ is $(X-Y) \times 10/Z$ (g).

According to a preferred embodiment of the present invention, the ten-point mean roughness (Rz) of 5 $\mu$m square at any position of the surface of the hydrophilic layer is 20 to 300 nm, more preferably 30 to 200 nm, still more preferably 40 to 150 nm. When the ten-point mean roughness (Rz) falls within the above range, an even, satisfactory water layer can be held, and, at the same time, satisfactory transparency, layer hardness, and endurance properties can be ensured. This surface state in terms of Rz may be realized by any method without particular limitation. For example, dispersion of hydrophilic metal oxide particles in the first hydrophilic layer can realize the above surface state.

According to a preferred embodiment of the present invention, the zeta potential at pH 7 of the surface of the hydrophilic layer is −40 to 40 mV, more preferably −30 to 30 mV. Regulating the zeta potential to a range close to zero in this way can effectively prevent the deposition of charged soil. For example, the regulation of the zeta potential can suppress the deposition of cationic surfactants contained as a main component of a rinse and anionic surfactants contained in a shampoo caused within a bathroom, can prevent a lowering in hydrophilicity or the development of water repellency, and thus can realize the retention of the antifogging property for a longer period of time. The zeta potential is further preferably brought to −25 to 0 mV. In this case, the deposition of negatively charged soil, such as silica or clayey inorganic materials, can be effectively prevented. This is advantageous when the hydrophilic material according to the present invention is utilized in the open exposed to dust in the air and exhaust gas of automobiles.

According to a preferred embodiment of the present invention, the static contact angle of the hydrophilic layer with water is not more than 35 degrees. This permits the water layer to be efficiently formed upon the deposition of water droplets, and, thus, the antifogging property can be improved. Bringing the static contact angle of the hydrophilic layer with water to not more than 20 degrees is more preferred because the water layer can be rapidly formed. In the case of stains or soils having relatively low polarity, such as greasy stains and soils generated, for example, from exhaust gas, a contact angle of not more than 35 degrees suffices for easily removing these stains or soils, for example, by rainwater. The contact angle is further preferably not more than 20 degrees.

According to a preferred embodiment of the present invention, the hydrophilic metal oxide particles comprise both hydrophilic metal oxide particles having positive charges and hydrophilic metal oxide particles having negative charges. This constitution can realize the above zeta potential and water contact angle. Hydrophilic metal oxide particles having positive charges include: those having a positive zeta potential at pH 7, for example, MgO, $La_2O_3$, ZnO, $\alpha$-$Fe_2O_3$, $Y_2O_3$, $\alpha$-$Al_2O_3$, and $\gamma$-$Al_2O_3$; and those having a negative zeta potential at pH 7, for example, $Cr_2O_3$, $CeO_2$, $ZrO_2$, $\gamma$-$Fe_2O_3$, FeO, $Fe_3O_4$, $TiO_2$, $SnO_2$, $MnO_2$, $SiO_2$, and $Sb_2O_5$. Among them, MgO, $Al_2O_3$, ZnO, $ZrO_2$, $TiO_2$, $Fe_2O_3$, and $SnO_2$ are preferred because they have a high level of hydrophilicity. Further, composite oxides of $SiO_2$, $Al_2O_3$, $TiO_2$, $ZrO_2$, MgO, $SnO_2$, ZnO, $Bi_2O_3$, CdO, PbO and the like are mainly strongly acidic, and are effective as materials having a positive zeta potential.

Coating Composition

A set of the first coating composition for the formation of the first hydrophilic layer and the second coating composition for the formation of the second hydrophilic layer may be used as a coating composition suitable for the formation of the hydrophilic layer according to the second aspect of the present invention.

The first coating composition consists essentially of a mixed solution composed of an alkali silicate and hydrophilic metal oxide particles, or a suspension of a metal oxide. According to a preferred embodiment of the present invention, in the first coating composition, the $SiO_2$ concentration (A) of the alkali silicate is 0.001 to 5% by weight, and the concentration (B) of the hydrophilic metal oxide particles is in the range of A: B=1:0.1 to 1:1000.

The second coating composition consists essentially of an alkali silicate solution and does not contain any hydrophilic metal oxide particles.

Water or alcohol is preferred as a solvent for the first and second coating compositions from the viewpoints of stability and workability. The solvent, however, is not particularly limited to water or alcohol.

According to a preferred embodiment of the present invention, various optional components, which may be added to the hydrophilic layer, may be added to the first and/or second coating compositions. For example, at least one member selected from the group consisting of boric acid, boric acid compounds, phosphoric acid, phosphoric acid compounds, and precursors of materials, which, upon heat treatment, are converted to $ZrO_2$, may be further incorporated as a solute. Further, preferably, both hydrophilic metal oxide particles having positive charges and hydrophilic metal oxide particles having negative charges are incorporated as hydrophilic metal oxide particles.

Production Process

The hydrophilic material according to the second aspect of the present invention may be produced by a process comprising the steps of: coating the first coating composition onto a substrate to form a first hydrophilic layer; and further coating the second coating composition onto the surface of the first hydrophilic layer to form a second hydrophilic layer.

The method for coating the coating composition is not particularly limited, and examples thereof include spray coating, flow coating, spin coating, dip coating, and roll coating. Although the optimal mixture concentration varies depending upon coating methods, according to these coating methods, coating followed by drying can form a layer. Therefore, these coating methods are not considered to have an influence on the form of concaves and convexes in the hydrophilic layer so far as the ratio of the ingredients is not changed.

According to a preferred embodiment of the present invention, if necessary, the coating of the first coating composition and/or the coating of the second coating composition may be heat treated. In this case, the surface temperature of the layer is more preferably brought to 80 to 500° C. When the surface temperature of the layer is brought to this temperature range, the water resistance requirement can be satisfied, while preventing a lowering in hydrophilicity caused by the stabilization of the structure in the surface of the inorganic material.

Layer Forming Apparatus

A layer forming apparatus suitable for the formation of the hydrophilic layer according to the present invention will be described.

The layer forming apparatus according to the present invention comprises: coating means for coating hydrophilic coating composition onto a substrate; a coating thickness regulation means for regulating the thickness of the coating of the coating composition; and heating means for heating the coating composition as the coating after the regulation of the coating thickness, wherein the coating thickness regulation means sprays gas onto the substrate to regulate the coating thickness to a desired value.

In this layer forming apparatus according to the present invention, coating means provided separately from the coating thickness regulation means, and, further, coating thickness regulation means is provided downstream of the coating means. By virtue of this construction, a layer can be evenly formed with a high efficiency onto substrates having a flat surface, as well as onto substrates having various surface shapes, such as curved surfaces and surfaces having irregularities. Further, by virtue of the adoption of non-contact coating thickness regulation means, wherein gas is sprayed against the substrate to regulate the coating thickness, the coating thickness can be regulated as desired without undergoing any influence of the surface shape.

Although the layer forming apparatus according to the present invention can form layers having various properties, the use of this layer forming apparatus as an apparatus for the formation of a hydrophilic layer (for example, an antifogging layer) is preferred. In the hydrophilic layer, a very small variation in layer thickness is likely to be causative of clouded state or interference color. The use of the apparatus according to the present invention can eliminate the above variation in the hydrophilic layer and permits the function inherent in the hydrophilic layer to be satisfactorily exhibited. Among others, alkali silicate layers are more preferred. The alkali silicate is likely to cause a clouded state, for example, particularly due to a very small variation in layer thickness. The apparatus according to the present invention, however, can effectively solve the above problem. Further, the substrate may be of various types. Preferably, however, the substrate is the same as that used in the hydrophilic materials according to the first and second aspects of the present invention.

This layer forming apparatus will be described in more detail.

(a) Coating Means

The coating means according to the present invention is used for coating the coating composition onto the substrate. The coating means may be of various types. Examples of preferred coating means include flow coating means and spray coating means. However, flow coating means is preferred because the inclusion of air can be minimized.

According to a preferred embodiment of the present invention, a hydrophilic coating composition, more preferably a coating composition as described above in connection with the first and second aspects of the present invention, is used as the coating composition. This can form a hydrophilic layer possessing excellent antifogging and antifouling properties.

(b) Coating Thickness Regulation Means

The coating thickness regulation means according to the present invention regulates and optimizes the coating thickness of the coating composition after coating, and is disposed on the downstream side in the direction of carriage of the coating means. In the present invention, the coating thickness regulation means is of non-contact type wherein gas is sprayed against the substrate to regulate the thickness of coating of the coating composition after the coating to a desired value. In this way, when the coating thickness is regulated in a non-contact manner using gas as a medium, a layer having even thickness can be easily formed without undergoing any influence of the form of the surface while preventing surface contamination and damage.

Figure 2:
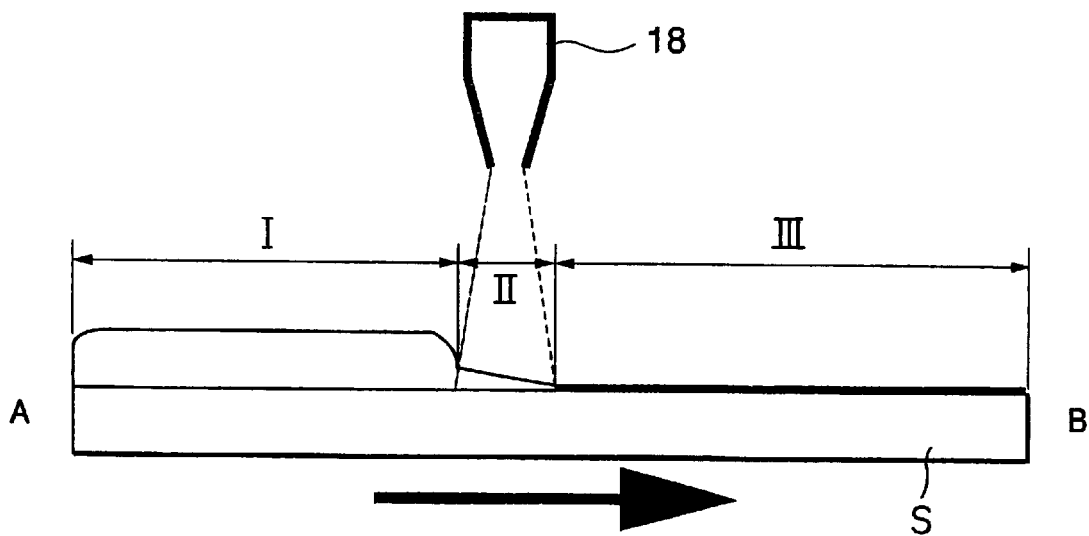
FIG. 2 is a conceptual diagram illustrating the formation of a layer by coating through the use of non-contact layer thickness regulation means in the layer forming apparatus according to the present invention.

According to a preferred embodiment of the present invention, the coating thickness regulation device is constructed so that a spout of a parallel slit is provided at a position such that the distance from the surface of the substrate being carried is identical, and gas is ejected through the spout. By virtue of this construction, gas can be evenly ejected to evenly regulate the coating thickness. FIG. 2 is a conceptual diagram illustrating the formation of a coating by means of the non-contact coating thickness regulation means. A substrate S advances from A toward B. In the drawing, zone I shows a state such that the coating composition has been coated onto the surface of the substrate. In zone II in the drawing, excessive coating composition is removed by a slit gas ejector 8 to regulate the coating thickness to a proper value. Zone III in the drawing shows a coating after the regulation of the coating thickness, and, in this case, the coating may be brought to a dried coating or a wet coating depending upon coating thickness regulation conditions.

According to a preferred embodiment of the present invention, the coating thickness regulation means is constructed so as to have the function of drying the coating of the coating composition. According to this construction, contaminants are less likely to be included in the surface of the layer in the step of baking.

(c) Heating Means

The heating means according to the present invention heats the coating of the coating composition after the regulation of the coating thickness to fix the layer to the substrate, and is disposed on the downstream side in the direction of carriage of the coating thickness regulation means. Various heating methods may be adopted in the heating means according to the present invention, and are not particularly limited. Examples of preferred heating methods usable herein include infrared, near infrared, extreme infrared, and hot air heating methods.

According to a preferred embodiment of the present invention, extreme infrared heating means is used as the heating means. According to the extreme infrared method, heat can be efficiently applied to the surface and, thus, burning time necessary for hardening the layer can be shortened. Further, the adoption of a rapid heating method, wherein heat is concentrated onto only the surface, is more preferred because the baking time can be further shortened contributing to improved productivity.

The present invention is also suitable for use in the formation of a layer on the surface of a mirror with a protective resin layer being provided on the backside thereof. In this case and in the case where the substrate is formed of a resin, the heating means is preferably provided with means for cooling the backside of the substrate so that excessive heat is not applied to the protective resin layer.

The coating means (a), the coating thickness regulation means (b), and the heating means (c) are preferably constructed so that a layer can be continuously formed through carrying means. Various types of carrying means may be used, and examples of carrying means include, but are not particularly limited to, belt conveyors and roller conveyors. Among them, roller conveyors are preferred from the viewpoint of the efficiency of recovery of excess coating composition, and mesh conveyors are preferred because the backside of the material can be easily cooled.

(d) Optional Means

According to a preferred embodiment of the present invention, a cleaning device for cleaning the surface of the hydrophilic layer is further provided downstream of the heating means. The provision of the cleaning device enables, for example, the removal of contaminants in the step of baking and the removal of unnecessary ingredients of the coating composition. In this cleaning device, means for cleaning with a detergent is provided separately from means for removing the detergent. This construction is preferred because the detergent is less likely to be left on the substrate with a layer formed thereon. The means for removing the detergent may be of contact type or non-contact type. The non-contact type, however, is preferred from the viewpoint of preventing the surface of the layer from being contaminated or damaged. Coating with the detergent may also be used in combination with cleaning by a physical method, for example, using a sponge or a brush.

According to a preferred embodiment of the present invention, cleaning means for cleaning the surface of the substrate may be provided upstream of the coating means. According to this construction, before the substrate is carried to the apparatus, contaminants deposited onto the surface of the substrate may be previously removed, and a layer may be then formed on the cleaned substrate. Cleaning by the cleaning means is possible when the cleaning means involves the step of cleaning with a detergent and the step of removing the detergent. In particular, the cleaning means preferably comprises: polishing agent supply means for supplying a polishing agent onto the surface of the substrate; surface polishing means for polishing the surface of the substrate with the supplied polishing agent; and polishing agent removing means for removing the polishing agent after the polishing. This construction can be adapted to the removal of all types of contaminants, enables a layer to be formed on the substrate in its surface having an enhanced level of cleanness, and, thus, can improve various properties of the layer and can improve the quality of the appearance.

According to a preferred embodiment of the present invention, a cooling device for cooling the substrate is provided downstream of the heating device. According to this construction, the cooling rate can be properly set, and, thus, strength or other properties of substrates, such as reinforced glass, can be controlled, or it is possible to prevent damage to glass substrates which are broken upon rapid cooling. The position of the cooling device disposed is not particularly limited so far as the cooling device is disposed downstream of the heating means. Preferably, however, the cooling device is disposed upstream of the cleaning device, for precooling before the treatment in the cleaning device.

The layer forming apparatus according to the present invention will be described in more detail with reference to the accompanying drawings.

Figure 3:
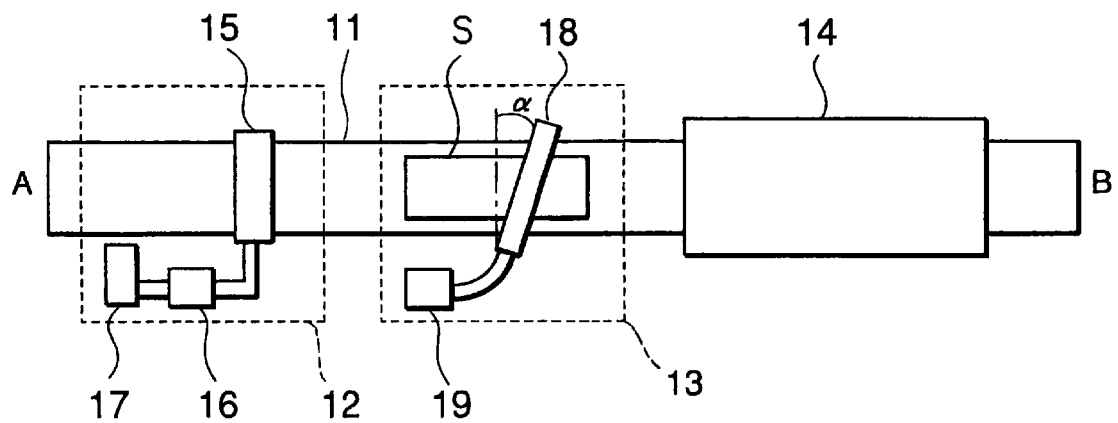
FIG. 3 is a schematic view (a plan view) of the layer forming apparatus according to the present invention.
Figure 4:
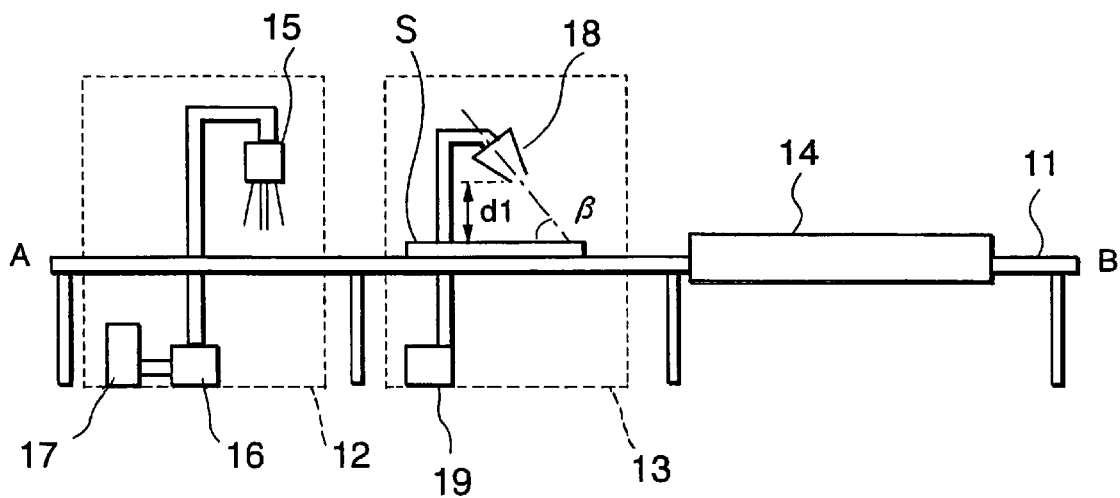
FIG. 4 is a schematic view (a front view) of the layer forming apparatus according to the present invention.

FIGS. 3 and 4 are schematic diagrams of the layer forming apparatus according to the present invention, wherein FIG. 3 is a plan view and FIG. 4 a front view.

As shown in FIGS. 3 and 4, the layer forming apparatus according to the present invention comprises coating means 12, coating thickness regulation means 13, and heating means 14 which are arranged in that order and are connected to one another through a carrier conveyor 11 which can carry a substrate.

The carrier conveyor 11 is a slat conveyor (JIS B 0140), formed of a mesh metal, which carries a substrate S from the coating means 12 toward the heating means 14 (from A toward B in FIGS. 3 and 4). The coating means 12, the coating thickness regulation means 13, and the heating means 14 are arranged in that order on the carrier conveyor 11.

The coating means 12 coats a coating composition onto the substrate S, and comprises a coating nozzle 15, a pump 16, and a coating composition tank 17. As shown in FIGS. 3 and 4, the coating means 12 is constructed so that a coating composition stored in the coating composition tank 17 supplied through a pump 16 into a coating nozzle 15 through which the coating composition is coated onto the substrate S. The coating means 12 can coat the coating composition onto the substrate in its whole coating face. The coating composition can be supplied into the coating nozzle by any method without particular limitation to the method shown in the drawing. Examples of other methods include: a force supply method wherein pressure is applied through a compressor to the coating composition tank to supply the coating composition; and a self-weight method wherein the coating composition is pumped into the coating composition tank disposed at a position above the coating nozzle and is spontaneously dropped on the coating nozzle. In the present invention, since the coating thickness regulation means is disposed downstream of the coating means, the coating means is not particularly limited so far as the coating composition can be coated onto the substrate in its whole coating face. Examples of suitable coating means include curtain flow utilizing a slit nozzle, spray coating, roll coater coating, and brush coating. In particular, curtain flow is more preferred because the air is less likely to cause the inclusion of air in the coating.

Figures 5A, 5B:
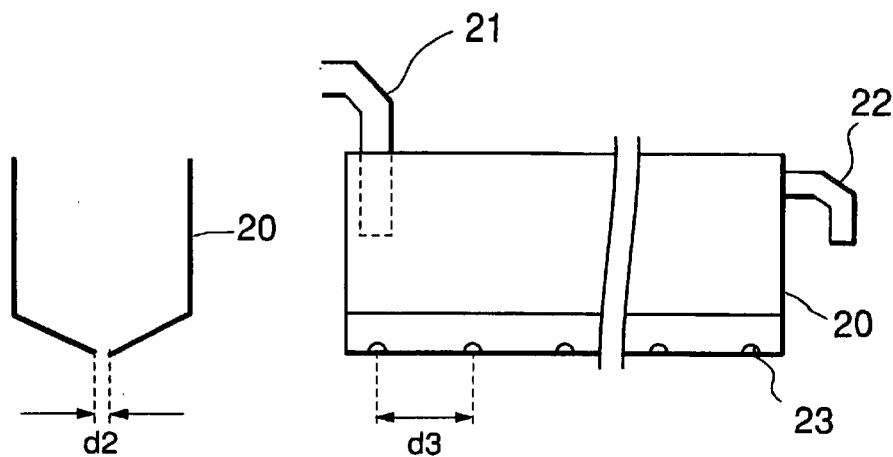
FIG. 5A is a schematic cross-sectional view showing an embodiment of a coating nozzle in the layer forming apparatus according to the present invention, and FIG. 5B a front view of the coating nozzle shown in FIG. 5A.
Figures 6A, 6B:
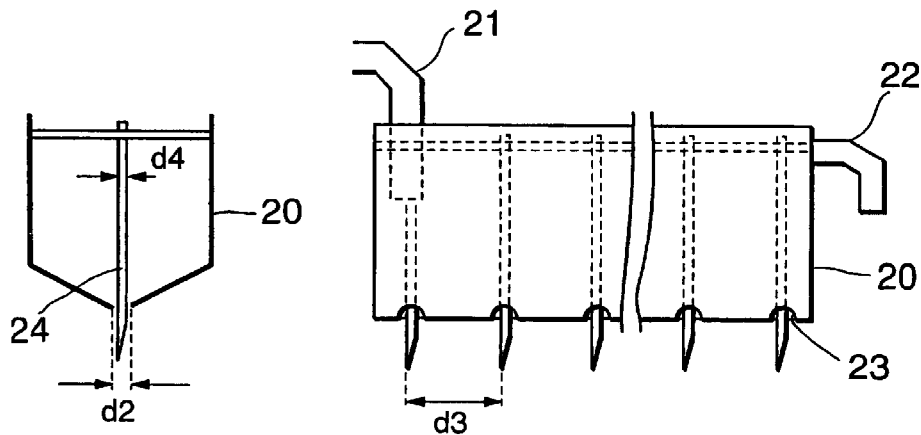
FIG. 6A is a schematic cross-sectional view showing an embodiment of a coating nozzle in the layer forming apparatus according to the present invention, and FIG. 6B a front view of the coating nozzle shown in FIG. 6A.

FIGS. 5 and 6 are schematic views showing one embodiment of the coating nozzle 15, wherein A is a cross-sectional view and B a front view. As shown in the same drawings, the coating nozzle 15 comprises a container 20 for storing the coating composition, a coating composition supply port 21 provided at the upper part of the container, an overflow 22 provided at the upper part of the side face of the container, openings 23 provided as holes at the bottom of the container, and needle materials 24 which are provided so as to be insertable into the openings and function to regulate the amount of the coating composition discharged. In this coating nozzle 15, the coating composition is supplied to the container 20 through the coating composition supply port 21, and excessive coating composition is discharged through the overflow 22. In this case, the coating composition reservoired in the container is passed through the openings 23 provided at the bottom of the container and is dropped on the substrate S.

Here as shown in FIG. 6, since the diameter of the needle material 24 in its front end is varied in the longitudinal direction, the amount of the coating composition discharged can be closely controlled by inserting the needle materials 24 into the respective openings 23 and vertically moving the needle materials 24. More specifically, the coverage is controlled by the diameter d2 of the openings 23, the diameter d4 of the needle material 24 inserted into the hole, and the spacing d3 of the holes 23. This method does not require any complicate equipment. Further, the use of the needle material 24 can prevent foaming of the coating composition on the substrate and, in addition, can minimize the amount of the coating composition dropped. The amount of the coating composition dropped onto the substrate is preferably 30 to 5000 cm$^3$, more preferably 50 to 1000 cm$^3$, in terms of coverage per m$^2$ of the coating face. When the coverage falls within this range, uneven coating is less likely to occur and, in addition, this is also advantageous from the viewpoint of cost.

The coating thickness regulation means 13 comprises a slit gas ejector 18 and a blower 19, and is disposed downstream of the coating means 12 through the carrier conveyor 11. The slit gas ejector 18 is a device for spraying gas on the substrate S in its coating composition coating face, and is preferably in the form of a parallel slit, which is located at a position such that the distance from the surface of the substrate being carried is identical, from the viewpoint of evenly ejecting gas onto the substrate to evenly regulate the coating thickness. The slit is preferably prepared so as to conform to the shape of the substrate. For example, when the substrate is in a flat plate form, the slit is preferably in a parallel linear form. On the other hand, when the substrate is in a cylindrical form, a method may be used wherein donut-shaped slits are disposed around the cylindrical substrate and the substrate is passed through the cylindrically arranged slits. The blower 19 supplies gas into the gas ejector 18. In this case, a filter for removing foreign matter is preferably used to suppress the deposition of contaminants onto the coating face. In order to regulate the thickness of coating of the coating composition formed on the substrate by the slit gas ejector 18, the pressure of air supplied by the blower is preferably 0.1 to 20 kPa, more preferably 0.4 to 2 kPa.

The angle of the slit gas ejector 18 to the carrier conveyor 11 (angle a in FIG. 3) is preferably −60 to 60 degrees. This facilitates the separation of excess coating composition removed from the substrate. Further, the angle of the ejection of gas to the substrate (angle β in FIG. 4) is preferably 40 to 130 degrees. When the angle β is in this range, the gas can strongly impact against the coating composition as the coating, and, thus, the coating thickness can be easily regulated. In addition, there is no fear that the gas after the completion of the coating thickness comes into contact with the coating composition as the coating before the regulation of the thickness and consequently causes waves and renders the coating uneven. Further, an angle β of 40 to 90 degrees is preferred from the viewpoint of regulating the coating thickness with good reproducibility. The spacing d1 between the slit gas ejector 18 and the substrate S is preferably 1 mm to 50 mm. The spacing d1 in the range of 1 mm to 50 mm can eliminate the possibility of the contact of the coating composition with the slit gas ejector and, in addition, permits the gas to strongly impact against the coating composition to satisfactorily regulate the coating thickness. Further, this can more effectively prevent the inclusion of foreign matter or contaminants, present around the substrate, in the coating.

Figure 7:
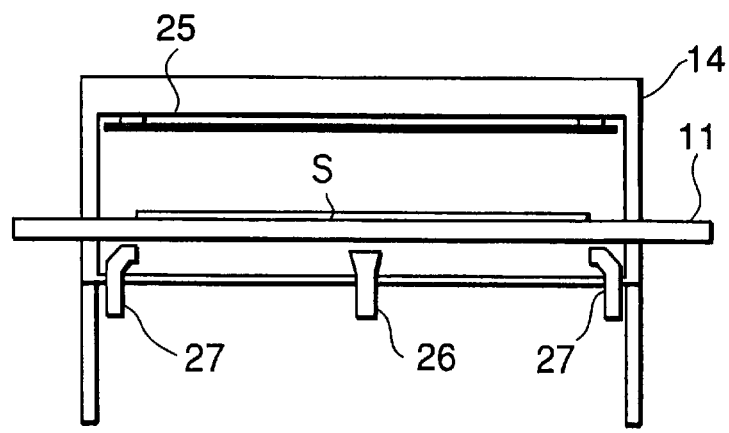
FIG. 7 is a schematic cross-sectional view of heating means, provided with means for cooling the backside of a substrate, in the layer forming apparatus according to the present invention.
Figure 8:
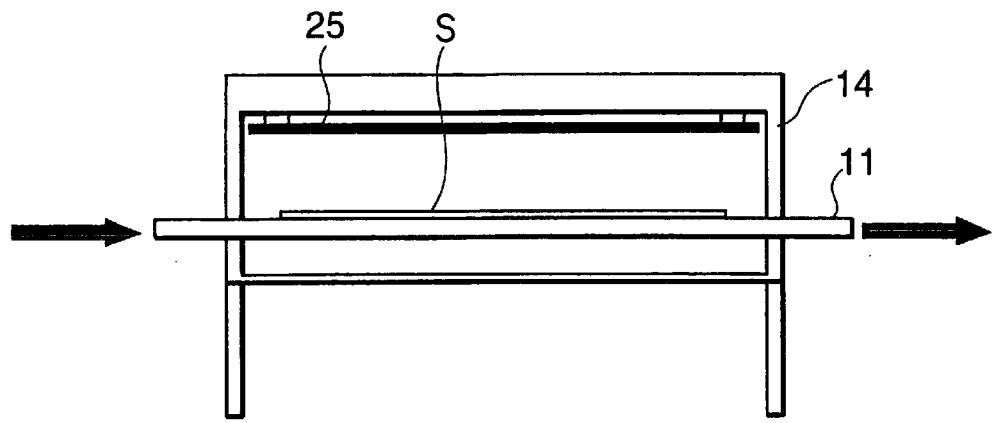
FIG. 8 is a schematic cross-sectional view of heating means, provided with means for cooling the backside of a substrate, in the layer forming apparatus according to the present invention.
Figure 9:
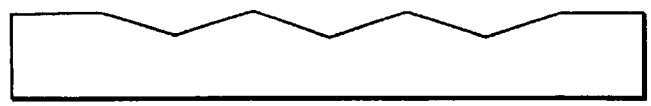
FIG. 9 is a cross-sectional view of an embodiment of the form of a substrate surface on which a layer can be formed by the layer forming apparatus according to the present invention.
Figure 10:
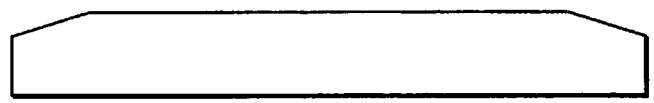
FIG. 10 is a cross-sectional view of another embodiment of the form of a substrate surface on which a layer can be formed by the layer forming apparatus according to the present invention.
Figure 11:
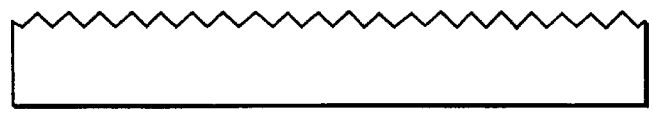
FIG. 11 is a cross-sectional view of a further embodiment of the form of a substrate surface on which a layer can be formed by the layer forming apparatus according to the present invention.
Figure 12:
FIG. 12 is a cross-sectional view of a still further embodiment of the form of a substrate surface on which a layer can be formed by the layer forming apparatus according to the present invention.

FIGS. 7 and 8 are schematic cross-sectional view of the heating means 14. The heating means 14 shown in FIG. 7 is an embodiment wherein means for cooling the backside of the substrate is used. This heating means comprises a heating element 25, a cooling nozzle 26, and an exhaust nozzle 27, and is disposed downstream of the coating thickness regulation means 13 through the carrier conveyor 11. The heating element 25 is provided above the carrier conveyor 11 so as to be parallel to the carrier face. An extreme infrared heater is preferably used as the heating element 25. The means for cooling the backside of the substrate is inserted below of the heating means 14, particularly below the carrier conveyor 11. The means for cooling the backside of the substrate comprises a cooling nozzle 26 for applying cooling air to the backside of the substrate S and an exhaust nozzle 27 for discharging the air from the cooling nozzle. In the cooling nozzle 26 shown in the drawing, cooling air is applied to the carrying line by means of a blower or the like. Alternatively, the cooling nozzle 26 may be constructed so that cooling water is allowed to flow. The provision of the backside cooling means permits the temperature of the backside of the substrate on the carrying line to be always kept below the temperature of the top surface of the substrate. Therefore, this is particularly effective in the case of a substrate with a protective resin layer being provided on the backside thereof, such as a mirror. A construction may also be adopted wherein means for cooling the substrate after the formation of the layer is provided downstream of the heating means. Examples of cooling means include: air cooling means for air cooling the substrate while allowing the substrate to contact with fresh air; blowing means; and furnace cooling means. Further, as shown in FIG. 8, it is a matter of course that the heating means 14 may not have any backside cooling means.

FIGS. 9 to 12 are cross-sectional views showing embodiments of the form of the substrate surface on which a layer can be formed by the layer forming apparatus according to the present invention. Even in the case of complicate forms of substrate surface other than those shown in FIGS. 9 to 12, a layer can be formed by properly setting the speed of the carrier conveyor and the coating thickness regulation means.

EXAMPLES

The present invention will be described in more detail with reference to the following examples, though it is not limited to these examples only.

Example A

The following Examples A1 to A4 and Comparative Examples A1 and A2 are provided for evaluating the hydrophilic material according to the first aspect of the present invention. That is, specimens prepared in Examples A1 to A4 fall within the scope of the first aspect of the present invention. Hydrophilic materials in these examples were evaluated by the following methods.

Test A1: Measurement of Surface Roughness

The form of an area of any 5 μm square in the surface of a hydrophilic layer in a specimen was measured with a scanning probe microscope (Model SPM-9500, manufactured by Shimadzu Seisakusho Ltd.) to calculate surface roughness.

Test A2: Measurement of Rz and Sm

As shown in FIG. 1, in an area of any 5 μm square in the surface of a hydrophilic layer in a specimen, a segment was set so as not to pass through metal oxide particles having a large particle diameter exposed to the surface to calculate Rz and Sm which were designated as Rz1 and Sm1, respectively. Further, a segment was set so as to pass through metal oxide particles having a large particle diameter to calculate Rz and Sm which were designated as Rz2 and Sm2, respectively.

Test A3: Evaluation of Hydrophilicity

A specimen, of which the surface temperature had been brought to 5° C., was installed in a bathroom which had been brought to an environment of 20° C. and 95% RH by using a warm water shower. Thereafter, water was applied onto the surface of the specimen. Ten min after the application of water, the specimen was inspected for fogging. In this case, the specimen, which had not caused fog, was evaluated as "A," and the specimen, which had caused fog, was evaluated as "B."

Test A4: Evaluation of Antifouling Property for Bathroom (Part A)

At the outset, at the time of bathing, soap was applied to a towel, and the body was rubbed with the towel. Contaminated water was then recovered as contaminated water A from the towel. Further, after a shampoo, a rinse was applied to the head, followed by rising of the head with warm water. This contaminated water was then recovered as contaminated water B.

A specimen was provided, and water was showered on the specimen. The contaminated water A and the contaminated water B each were deposited in an amount of about 0.5 g per 100 mm×100 mm. This specimen was dried for 15 min in a drier set at 40° C. This procedure was repeated seven times, and, thereafter, the specimen was cleaned with a sponge for a bath with the aid of a neutral detergent for a bath. The above procedure completed one cycle. For each cycle, the hydrophilicity was evaluated in the same manner as described above in connection with the test A3.

Test A5: Evaluation of Antifouling Property for Bathroom (Part B)

The antifouling property for a bathroom was evaluated in the same manner as used in the test A4, except that, after the deposition of contaminated water and before drying in a drier, the specimen was showered with running water.

Test A6: Endurance to Detergent for Mould Killing

The specimen was immersed in a commercially available detergent for mound killing (Kabi Killer, manufactured by Johnson) for 24 hr. After the immersion, the specimen was inspected for the state of the layer, and, in addition, was evaluated for the hydrophilicity in the same manner as used in the test A3.

Test A7: Contamination with Pseudo-stain

Two specimens were provided one of which was a specimen A with a hydrophilic layer formed thereon and the other was a specimen B that was a substrate per se with no hydrophilic layer formed thereon. Color values (L*, a*, and b*) of the specimen A and the specimen B were previously measured with a color difference meter (CM-3700d, manufactured by Minolta). Next, these specimens were placed on a table inclined at 45 degrees. Subsequently, a contamination accelerating liquid was dropped 36 times per min on the specimens by means of a tube pump from above the specimens, and this was continued for 5 hr. After drying, color values were measured in the same manner as described above, and a color difference ($\Delta E^*$) was calculated. The contamination accelerating liquid used was a pseudo-stain which had been prepared as a material alternative to a contaminant in an urban area. More specifically, the contamination accelerating liquid was a dispersion of 0.05 g of carbon black, 0.05 g of silica, 0.225 g of fired Kanto loam soil, and 0.675 g of yellow soil in 1000 cm$^3$ of water.

Example A1

(a) Provision of Substrate

A commercially available glass mirror having a size of 10 cm square was provided as a substrate 4. This substrate was cleaned with cerium oxide powder.

(b) Preparation of Coating Composition

Lithium silicate (Lithium Silicate 35, manufactured by Nissan Chemical Industries Ltd.) was provided as a hydrophilic inorganic amorphous material, silica particles (Snowtex 50, particle diameter 20 to 30 nm, manufactured by Nissan Chemical Industry Ltd.) were provided as first hydrophilic metal oxide particles, and silica particles (Snowtex ZL, particle diameter 70 to 100 nm, manufactured by Nissan Chemical Industry Ltd.) were provided as second hydrophilic metal oxide particles. These ingredients were dispersed in water to prepare a coating composition A containing 0.75% by weight, in terms of $SiO_2$ concentration, of the hydrophilic inorganic amorphous material, 0.75% by eight, in terms of $SiO_2$ concentration, of the first hydrophilic metal oxide particles, and 0.75% by weight, in terms of $SiO_2$ concentration, of the second hydrophilic metal oxide particles.

Separately, an alkali silicate (SLN 73 (components: $SiO_2$, $Na_2O$, $Li_2O$, and $B_2O_3$), manufactured by Nippon Chemical Industrial Co., Ltd.) was provided as a hydrophilic inorganic amorphous material, and silica particles (Snowtex 20, particle diameter 10 to 20 nm, manufactured by Nissan Chemical Industry Ltd.) were provided as first hydrophilic metal oxide particles. These ingredients were dispersed in water to prepare a coating composition B containing 0.5% by weight, in terms of $SiO_2$ concentration, of the hydrophilic inorganic amorphous material and 0.75% by weight, in terms of $SiO_2$ concentration, of the first hydrophilic metal oxide particles.

(c) Preparation of Specimen

The coating composition A was spin coated onto the surface of the substrate after the cleaning, and the coated substrate was then dried. The coating composition B was then spin coated onto the coating of the coating composition A, followed by drying. The dried, coated substrate was then heat treated at 150° C. for 10 min. Thus, a specimen was prepared.

(d) Tests and Results

The specimen was subjected to the tests A1 to A6. The results were as follows.

Test A1: The surface roughness was 20.7 nm.

Test A2: Rz1 was 25 nm, Sm1 190 nm, Rz2 97 nm, and Sm2 384 nm.

Test A3: The hydrophilicity was evaluated as A.

Test A4: The evaluation was A even after the completion of 10 cycles.

Test A5: The evaluation was A even after the completion of 10 cycles.

Test A6: The hydrophilic layer was not separated, and the hydrophilicity was evaluated as A.

Example A2

(a) Provision of Substrate

A commercially available stainless steel reflecting mirror as a substrate was cleaned with a polishing agent.

(b) Preparation of Coating Composition

Lithium silicate (Lithium Silicate 75, manufactured by Nissan Chemical Industries Ltd.) was provided as a hydrophilic inorganic amorphous material, alumina particles (Alumina Sol 520, particle diameter 10 to 20 nm, manufactured by Nissan Chemical Industry Ltd.) were provided as first hydrophilic metal oxide particles, and zirconia particles (Zirconia Sol NZS-30B, particle diameter 70 nm, manufactured by Nissan Chemical Industry Ltd.) were provided as second hydrophilic metal oxide particles. These ingredients were dispersed in water to prepare a mixed solution containing 0.75% by weight of $SiO_2$, 0.5% by weight of $A_2O_3$, and 0.5% by weight of $ZrO_2$. A minor amount of a dilution of aluminum phosphate (1% by weight on a solid basis) was added to the mixed solution to prepare a coating composition C.

(c) Preparation of Specimen

The coating composition C was flow coated onto the surface of the substrate after the cleaning, and the coated substrate was then dried. The coated substrate was then heat treated at 250° C. for 5 min. Thus, a specimen was prepared.

(d) Tests and Results

The specimen was subjected to the tests A1 to A5. The results were as follows.

Test A1: The surface roughness was 17.8 nm.

Test A2: Rz1 was 29 nm, Sm1 151 nm, Rz2 69 nm, and Sm2 575 nm.

Test A3: The hydrophilicity was evaluated as A.

Test A4: The evaluation was A even after the completion of 10 cycles.

Test A5: The evaluation was A even after the completion of 10 cycles.

Example A3

(a) Provision of Substrate

A transparent acrylic plate having a size of 10 cm square was provided as a substrate. This substrate was degreased and cleaned.

(b) Preparation of Coating Composition

Silica particles (Snowtex 50, particle diameter 20 to 30 nm, manufactured by Nissan Chemical Industry Ltd.) were provided as first hydrophilic metal oxide particles, and silica particles (Snowtex XL, particle diameter 40 to 60 nm, manufactured by Nissan Chemical Industry Ltd.) were provided as second hydrophilic metal oxide particles. These ingredients were dispersed in water to prepare a coating composition D containing 0.75% by weight, in terms of $SiO_2$ concentration, of the first hydrophilic metal oxide particles and 0.75% by weight, in terms of $SiO_2$ concentration, of the second hydrophilic metal oxide particles.

Separately, lithium silicate (Lithium Silicate 35, manufactured by Nippon Chemical Industrial Co., Ltd.) was provided as a hydrophilic inorganic amorphous material. This ingredient was dispersed in water to prepare a coating composition E having an $SiO_2$ content of 1.25% by weight.

(c) Preparation of Specimen

The coating composition D was spray coated onto the surface of the substrate after the cleaning, and the coated substrate was then dried. The coating composition E was then spin coated onto the coating of the coating composition D. The coated substrate was then dried. Thus, a specimen was prepared.

(d) Tests and Results

The specimen was subjected to the tests A1 to A5. The results were as follows.

Test A1: The surface roughness was 11.6 nm.

Test A2: Rz1 was 28 nm, Sm1 178 nm, Rz2 70 nm, and m2 371 nm.

Test A3: The evaluation was A.

Test A4: The evaluation was A even after the completion of 10 cycles.

Test A5: The evaluation was A even after the completion of 10 cycles.

Example A4

(a) Provision of Substrate

Two glazed porcelain white tiles (AB06E11, manufactured by TOTO, LTD.) were provided as substrates. Both the substrates were cleaned with a surfactant and were then air dried. The these two tiles were designated as tile A and tile B, respectively.

(b) Preparation of Coating Composition

Lithium silicate (Lithium Silicate 35, manufactured by Nissan Chemical Industry Ltd.) was provided as a hydrophilic inorganic amorphous material, silica particles (Snowtex 50, particle diameter 20 to 30 nm, manufactured by Nissan Chemical Industry Ltd.) and titanium oxide particles (A-6, particle diameter 10 nm, manufactured by Taki Chemical Co., Ltd.) were provided as first hydrophilic metal oxide particles 2, and silica particles (Snowtex ZL, particle diameter 70 to 100 nm, manufactured by Nissan Chemical Industry Ltd.) were provided as second hydrophilic metal oxide particles. These ingredients were dispersed in water to prepare a coating composition F containing 0.75% by weight, in terms of $SiO_2$ concentration, of the hydrophilic inorganic amorphous material, 0.2% by weight of the first hydrophilic metal oxide particles, 0.25% by weight, in terms of $SiO_2$ concentration, of the second hydrophilic metal oxide particles, and 0.3% by weight of $TiO_2$.

(c) Preparation of Specimen

The coating composition F was spray coated onto the tile A only, and the coated tile was dried. Thereafter, the dried, coated tile was heat treated at 350° C. for 5 min. Thus, a specimen was prepared.

(d) Tests and Results

For the treated tile A (specimen), the tests A1 and A2 were carried out. Further, for the treated tile A (specimen) and the tile B, the test A7 was carried out. The results were as follows.

Test A1: The surface roughness was 19.5 nm.

Test A2: Rz1 was 29 nm, Sm1 223 nm, Rz2 95 nm, and Sm2 632 nm.

Test A7: For the treated tile A (specimen), ΔE* was 0.4, and, for the tile B, ΔE* was 4.3.

Comparative Example A1

(a) Preparation of Substrate and Specimen

A commercially available glass mirror having a size of 10 cm square was provided as a substrate. The substrate was cleaned with a neutral detergent and was then air dried. This substrate as such was used as a specimen.

(b) Tests and Results

The tests A1 to A5 were carried out for the specimen. The results were as follows.

Test A1: The surface roughness was 0.001 nm.

Test A2: Rz1 was 0.0 nm, and Sm1 460 nm. Rz2 and Sm2 were immeasurable due to even surface.

Test A3: The evaluation was B.

Test A4: After the completion of the first cycle, the evaluation became B.

Test A5: After the completion of the first cycle, the evaluation became B.

Comparative Example A2

(a) Provision of Substrate

A commercially available plate glass having a size of 10 cm square was provided as a substrate. This substrate was cleaned with cerium oxide powder.

(b) Preparation of Coating Composition

Lithium silicate (Lithium Silicate 35, manufactured by Nissan Chemical Industries Ltd.) as a hydrophilic inorganic amorphous material was diluted to 1% by weight of $SiO_2$ to prepare a coating composition G.

(c) Preparation of Specimen

The coating composition G was roll coated onto the surface of the substrate after the cleaning. The coated substrate was heat treated at 600° C. for one min. Thus, a specimen was prepared.

(d) Tests and Results

For the specimen, the tests A1 to A5 were carried out. The results were as follows.

Test A1: The surface roughness was 0.4 nm.

Test A2: Rz1 was 1 nm, Sm1 270 nm. Rz2 and Sm2 were immeasurable due to even surface.

Test A3: The evaluation was B.

Test A4: After the completion of the first cycle, the evaluation became B.

Test A5: After the completion of the first cycle, the evaluation became B.

Example B

The following Examples B1 and B2 and Comparative Examples B1 and B2 are provided for evaluating the hydrophilic material according to the second aspect of the present invention. That is, specimens prepared in Examples B1 and B2 fall within the scope of the second aspect of the present invention. Hydrophilic materials in these examples were evaluated by the following methods.

Test B1: Retention of Water as Water Layer

At the outset, the specimen was held and stabilized in an environment set at room temperature (15 to 25° C.) and a relative humidity of 30 to 80% for one hr or longer. The weight of the stabilized specimen was measured with an electronic force balance. Next, this specimen was disposed so that the hydrophilic surface was substantially vertical. Thereafter, only the hydrophilic surface was wetted with water of which the temperature had been made substantially equal to room temperature (15 to 25° C.). 15 sec after the wetting of the surface, water collected at the bottom was removed. The weight of the specimen, from which excess water had been removed, was measured with an electronic force balance. The degree of a change in weight of the specimen after the deposition of water from the weight of the specimen before the deposition of water was calculated to determine the weight of a water layer deposited on the specimen.

Test B2: Contact Angle

The specimen was allowed to stand in a room of an environment of 20° C. and 45%RH for one week or longer. The contact angle of the specimen with water was then measured with a contact angle goniometer (Model CA-X150, manufactured by Kyowa Interface Science Co., Ltd.).

Test B3: Measurement of Roughness

The form of an area of any 5 μm square in the surface of a hydrophilic layer in a specimen was measured with a scanning probe microscope (Model SPM-9500, manufactured by Shimadzu Seisakusho Ltd.) to calculate ten-point mean roughness.

Test B4: Pencil Hardness

A pencil with a density symbol specified in JIS S 6006 (pencil and colored pencil) was held at an angle of 45 degrees to the coating face, and the pencil was slid at a speed of about 3 mm per sec forward from the foreground with the strongest possible force such that the lead was not broken. At that time, the layer was inspected for damage. The highest pencil hardness, which did not damage the layer, was regarded as the pencil hardness of the specimen.

Test B5: Antifogging

A specimen, of which the surface temperature had been brought to 5° C., was installed in a bathroom which had been brought to an environment of 20° C. and 95%RH by using a warm water shower. Thereafter, water was applied onto the surface of the specimen. Ten min after the application of water, the specimen was inspected for fogging. In this case, the specimen, which had not caused fog, was evaluated as "A," and the specimen, which had caused fog, was evaluated as "B."

Test B6: Contamination with Pseudo-stain

Two specimens were provided one of which was a specimen A with a hydrophilic layer formed thereon and the other was a specimen B that was a substrate per se with no hydrophilic layer formed thereon. Color values (L*, a*, and b*) of the specimen A and the specimen B were previously measured with a color difference meter (CM-3700d, manufactured by Minolta). Next, these specimens were placed on a table inclined at 45 degrees. Subsequently, a contamination accelerating liquid was dropped 36 times per min on the specimens by means of a tube pump from above the specimens, and this was continued for 5 hr. After drying, color values were measured in the same manner as described above, and a color difference ($\Delta E^*$) was calculated. The contamination accelerating liquid used was a pseudo-stain which had been prepared as a material alternative to a contaminant in an urban area. More specifically, the contamination accelerating liquid was a dispersion of 0.05 g of carbon black, 0.05 g of silica, 0.225 g of fired Kanto loam soil, and 0.675 g of yellow soil in 1000 cm$^3$ of water.

Example 1

(a) Provision of Substrate

A commercially available glass mirror having a size of 10 cm square was provided as a substrate. This substrate was cleaned with cerium oxide powder.

(b) Preparation of Coating Composition

Lithium silicate (Lithium Silicate 35, manufactured by Nissan Chemical Industries Ltd.) and silica particles (Snowtex XL, particle diameter 40 to 60 nm, manufactured by Nissan Chemical Industry Ltd.) were provided. These ingredients were dispersed in water to prepare a coating composition H containing 0.5% by weight, in terms of $SiO_2$ concentration, of lithium silicate and 0.5% by weight, in terms of $SiO_2$ concentration, of silica particles.

Separately, an alkali silicate (SLN 73 (components: $SiO_2$, $Na_2O$, $Li_2O$, and $B_2O_3$), manufactured by Nippon Chemical Industrial Co., Ltd.) was diluted with water to prepare a coating composition I having an $SiO_2$ content of 2% by weight.

(c) Preparation of Specimen

The coating composition H was dip coated onto the surface of the substrate after the cleaning. The coating composition I was then dip coated onto the coating of the coating composition H. The coated substrate was then heat treated at 150° C. for 10 min. Thus, a specimen was prepared.

(d) Tests and Results

The specimen was subjected to the tests B1 to B5. The results were as follows.

Test B1: The retention of water as water layer was 0.3 g.
Test B2: The contact angle with water was 19 degrees.
Test B3: The ten-point mean roughness was 108 nm.
Test B4: The pencil hardness was 8H.
Test B5: The evaluation was A.

Example B2

(a) Provision of Substrate

Two glazed porcelain white tiles (AB06E11, manufactured by TOTO, LTD.) were provided as substrates. Both the substrates were cleaned with a surfactant and were then air dried. The these two tiles were designated as tile C and tile D, respectively.

(b) Preparation of Coating Composition

Coating composition H and coating composition I were prepared in the same manner as in Example B1.

(c) Preparation of Specimen

The coating composition H was spray coated onto the tile C only. Thereafter, the coating composition I was sprayed on the coating of the coating composition H. The coated tile was heat treated at 150° C. for 10 min. Thus, a specimen was prepared.

(d) Tests and Results

The specimen was subjected to the tests B1 to B4 and B6. The results were as follows.

Test B1: The retention of water as water layer was 0.3 g.
Test B2: The contact angle with water was 17 degrees.
Test B3: The ten-point mean roughness was 140 nm.
Test B4: The pencil hardness was 7H.
Test B6: For the treated tile C (specimen), $\Delta E^*$ was 0.6, and, for the tile D, $\Delta E^*$ was 4.3.

Comparative Example B1

(a) Provision of Substrate and Specimen

A commercially available glass mirror having a size of 10 cm square was provided as a substrate. The substrate was cleaned with a neutral detergent and was then air dried. This substrate as such was used as a specimen.

(b) Tests and Results

The tests B1 to B3 and B5 were carried out for the specimen. The results were as follows.

Test B1: The retention of water as water layer was 0 g.
Test B2: The contact angle with water was 50 degrees.
Test B3: The ten-point mean roughness was 4 nm.
Test B5: The evaluation was B.

Comparative Example B2

(a) Provision of Substrate

A commercially available glass plate having a size of 10 cm square was provided as a substrate. This substrate was cleaned with cerium oxide powder.

(b) Preparation of Coating Composition

A coating composition G was prepared in the same manner as in Comparative Example A2.

(c) Preparation of Specimen

The coating composition G was roll coated onto the surface of the substrate after the cleaning. The coated substrate was heat treated at 600° C. for 10 min. Thus, a specimen was prepared.

(d) Tests and Results

The specimen thus obtained was subjected to the tests B1 to B5. The results were as follows.

Test B1: The retention of water as water layer was 0 g.
Test B2: The contact angle with water was 35 degrees.
Test B3: The ten-point mean roughness was 3 nm.

Test B4: The pencil hardness was 9H.
Test B5: The evaluation was B.

Example C

The following Example C1 and Comparative Examples C1 and C2 are provided for evaluating the hydrophilic material according to the first aspect of the present invention. That is, specimens prepared in Example C1 fall within the scope of the first aspect of the present invention. Hydrophilic materials in these examples were evaluated by the following methods.

Test C1: Zeta Potential

In order to prevent a variation in zeta potential caused by components eluted from the layer and the substrate, the specimen was first immersed in warm water of 60° C. for 8 hr. Thereafter, the specimen was washed with distilled water. For the hydrophilic layer of this specimen, zeta potentials at pH values around 7 were measured with a laser zeta electrometer (ELS-6000, manufactured by Otsuka Denshi K. K.), and the zeta potential at pH=7 was calculated based on an approximating curve of the results of measurement.

Test C2: Contact Angle with Water

The specimen was stored at room temperature for 10 days or longer. The contact angle of the specimen with water was then measured with a contact angle goniometer (Model CA-X150, manufactured by Kyowa Interface Science Co., Ltd.).

Test C3: Surface Roughness

The form of an area of any 5 μm square in the surface of a hydrophilic layer in a specimen was measured with a scanning probe microscope (Model SPM-9500, manufactured by Shimadzu Seisakusho Ltd.) to calculate arithmetical mean roughness (Ra) in terms of face expanded surface roughness, specified in JIS B 0601 based on the results of the measurement.

Test C4: Hydrophilicity

A specimen, of which the surface temperature had been brought to 5° C., was installed in a bathroom which had been brought to an environment of 20° C. and 95%RH by using a warm water shower. Thereafter, water was applied onto the whole surface of the specimen. Ten min after the application of water, the specimen was inspected for fogging. In this case, the specimen, which had not caused fog, was evaluated as "A," the specimen, which had caused fog on a part of the specimen, was evaluated as "B," and the specimen, which had caused fog on the whole area of the specimen, was evaluated as "C."

Test C5: Antifouling Property for Bathroom

At the outset, a specimen having a size of 100 mm×200 mm was brought to room temperature and was immersed in a 0.5% soap solution, and the surface of the specimen was then showered. Further, this specimen was immersed in a 0.5% rinse solution, and the surface of the specimen was showered. The specimen was then allowed to stand in a drier set at 50° C. for 48 hr. Thereafter, the specimen was cleaned with a neutral detergent for bathing by means of a sponge. The treated specimen was then evaluated for hydrophilicity in the same manner as used in the test C4. This series of steps were repeated until the evaluation of the hydrophilicity became C, and the antifouling property was evaluated based on the number of times.

Example C1

(a) Provision of Substrate

A commercially available glass mirror was provided as a substrate. This substrate was polished with cerium oxide powder, and was then satisfactorily washed with running water.

(b) Preparation of Coating Composition

An alkali silicate (SLN 73 (components: $SiO_2$, $Na_2O$, $Li_2O$, and $B_2O_3$), manufactured by Nippon Chemical Industrial Co., Ltd.) was provided as a hydrophilic inorganic amorphous material, silica particles (Snowtex 50, particle diameter 20 to 30 nm, manufactured by Nippon Chemical Industrial Co., Ltd.) were provided as first hydrophilic metal oxide particles, and silica particles (Snowtex ZL, particle diameter 70 to 100 nm, manufactured by Nippon Chemical Industrial Co., Ltd.) and silica particles (Snowtex XL, particle diameter 40 to 60 nm, manufactured by Nippon Chemical Industrial Co., Ltd.) were provided as second hydrophilic metal oxide particles. These ingredients were dispersed in water to prepare a coating composition J containing 0.4% by weight, in terms of $SiO_2$ concentration, of the alkali silicate, 0.2% by weight, in terms of $SiO_2$ concentration, of Snowtex ZL, 0.3% by weight, in terms of $SiO_2$ concentration, of Snowtex XL, and 0.2% by weight, in terms of $SiO_2$ concentration, of Snowtex 50.

Separately, an alkali silicate (SLN 73 (components: $SiO_2$, $Na_2O$, $Li_2O$, and $B_2O_3$), manufactured by Nippon Chemical Industrial Co., Ltd.) was provided as a hydrophilic inorganic amorphous material, and silica particles coated with alumina (SILICADOL 20P, particle diameter 20 to 30 nm, manufactured by Nippon Chemical Industrial Co., Ltd.) were provided as hydrophilic metal oxide particles. These ingredients were dispersed in water to prepare a coating composition K containing 0.25% by weight, in terms of $SiO_2$ content, of an alkali silicate and 0.5% by weight on a solid basis of silica particles coated with alumina.

(c) Preparation of Specimen

The coating composition J was spin coated onto the surface of the substrate after the cleaning. Next, the coating composition K was then spin coated onto the coating of the coating composition J. The coated substrate was then heat treated at 150° C. for 10 min. Thus, a specimen was prepared.

(d) Tests and Results

The specimen was subjected to the tests C1 to C5. The results were as follows.
  Test C1: The zeta potential was −25 mV.
  Test C2: The contact angle with water was 15 degrees.
  Test C3: Ra was 22.5 nm.
  Test C4: The evaluation was A.
  Test C5: The evaluation became C after the completion of the tenth cycle.

Comparative Example C1

(a) Provision of Substrate and Specimen

A commercially available glass mirror was provided as a substrate. The substrate was cleaned with a neutral detergent. This substrate as such was used as a specimen.

(b) Tests and Results

The tests C1 to C5 were carried out for the specimen. The results were as follows.
  Test C1: The zeta potential was −40 mv.
  Test C2: The contact angle with water was 45 degrees.
  Test C3: Ra was 0.8 nm.
  Test C4: The evaluation was C.
  Test C5: The evaluation was C after the completion of the first cycle.

Comparative Example C2

(a) Provision of Substrate

A commercially available glass mirror was provided as a substrate. This substrate was polished with cerium oxide powder, and was then satisfactorily washed with running water.

(b) Preparation of Coating Composition

An alkali silicate (SLN 73 (components: $SiO_2$, $Na_2O$, $Li_2O$, and $B_2O_3$), manufactured by Nippon Chemical Industrial Co., Ltd.) provided as a hydrophilic inorganic amorphous material was diluted to bring the $SiO_2$ content to 1% to prepare a coating composition L.

(c) Preparation of Specimen

The coating composition L was spin coated onto the surface of the substrate after the cleaning. The coated substrate was then heat treated at 150° C. for 10 min. Thus, a specimen was prepared.

(d) Tests and Results

The specimen was subjected to the tests C1 to C5. The results were as follows.

Test C1: The zeta potential was −47 mv.
Test C2: The contact angle with water was 19 degrees.
Test C3: Ra was 1.3 nm.
Test C4: The evaluation was B.
Test C5: The evaluation was C after the completion of the first cycle.

What is claimed is:

1. A hydrophilic material comprising:
   a substrate; and
   a hydrophilic layer provided as the outermost layer on the substrate;
   the hydrophilic layer comprising hydrophilic metal oxide particles and a hydrophilic inorganic amorphous material;
   the hydrophilic layer having profile peaks on its surface;
   the hydrophilic layer having roughness properties such that, when a segment is set in only a portion not containing the profile peaks, the ten-point mean roughness (Rz) and the mean distance between concaves and convexes (Sm) obtained from a profile curve in the segment are 10 nm≦Rz≦40 nm and 10 nm≦Sm≦300 nm, respectively, while, when a segment is set so as to pass through the profile peaks, the ten-point mean roughness (Rz) and the mean distance between concaves and convexes (Sm) obtained from a profile curve in the segment are 40 nm≦Rz≦200 nm and 300 nm≦Sm≦1500 nm, respectively.

2. The hydrophilic material according to claim 1, wherein the hydrophilic metal oxide particles comprise first hydrophilic metal oxide particles having a particle diameter distribution with the mode of particle diameter being not less than 3 nm and less than 40 nm and second hydrophilic metal oxide particles having a particle diameter distribution with the mode of particle diameter being not less than 40 nm and not more than 300 nm.

3. The hydrophilic material according to claim 2, wherein the mode of particle diameter of the first hydrophilic metal oxide particles is 10 to 30 nm and the mode of particle diameter of the second hydrophilic metal oxide particles is 40 to 100 nm.

4. The hydrophilic material according to claim 1, wherein the hydrophilic metal oxide particles comprise at least one member selected from the group consisting of $SiO_2$, $Al_2O_3$, $ZrO_2$, $TiO_2$, and $SnO_2$.

5. The hydrophilic material according to claim 1, wherein the hydrophilic inorganic amorphous material comprises at least one member selected from the group consisting of alkali silicates, alkali borosilicates, alkali zirconates, and metal phosphates.

6. The hydrophilic material according to claim 1, wherein the zeta potential at pH 7 of the surface of the hydrophilic layer is −40 to 40 mV and the static contact angle of the layer with water is not more than 35 degrees.

7. The hydrophilic material according to claim 6, wherein the zeta potential is −30 to 30 mV.

8. The hydrophilic material according to claim 6, wherein the zeta potential is −25 to 0 mV.

9. The hydrophilic material according to claim 6, wherein the static contact angle is not more than 20 degrees.

10. The hydrophilic material according to claim 1, wherein the hydrophilic metal oxide particles comprise both hydrophilic metal oxide particles having positive charges and hydrophilic metal oxide particles having negative charges.

11. The hydrophilic material according to claim 1, wherein the substrate is selected from the group consisting of inorganic materials, metal materials, organic materials, and composites of said materials.

12. The hydrophilic material according to claim 1, wherein the substrate is selected from the group consisting of tiles, sanitary wares, tablewares, glasses, mirrors, reflector plates, protective plates, protective films, ceramic wares, calcium silicate boards, cements, woods, resins, metals, and ceramics.

13. The hydrophilic material according to claim 1, wherein the substrate is selected from the group consisting of glasses, glass covers, mirrors, reflector plates, protective plates, films, and protective films.

14. The hydrophilic material according to claim 1, wherein the substrate is a material for bathrooms.

15. The hydrophilic material according to claim 1, wherein the substrate is a mirror for bathrooms.

16. A coating composition for the production of the hydrophilic material according to claim 1, said coating composition comprising:
   a solvent, and;
   a solute;
   said solute comprising at least first hydrophilic metal oxide particles having a particle diameter distribution with the mode of particle diameter being 3 to 40 nm and second hydrophilic metal oxide particles having a particle diameter distribution with the mode of particle diameter being 40 to 300 nm.

17. The coating composition according to claim 16, wherein the mode of particle diameter of the first hydrophilic metal oxide particles is 10 to 30 nm and the mode of particle diameter of the second hydrophilic metal oxide particles is 40 to 100 nm.

18. The coating composition according to claim 16, which further comprises a precursor of the hydrophilic inorganic amorphous material.

19. The coating composition according to claim 18, wherein the precursor of the hydrophilic inorganic amorphous material comprises at least one member selected from the group consisting of alkali silicates, alkali borosilicates, alkali zirconates, and metal phosphates.

20. The coating composition according to claim 18 or 19, wherein the precursor of the hydrophilic inorganic amorphous material comprises an alkali silicate.

21. The coating composition according to claim 16, wherein the hydrophilic metal oxide particles comprises at least one member selected from the group consisting of $SiO_2$, $Al_2O_3$, $ZrO_2$, $TiO_2$, and $SnO_2$.

22. The coating composition according to claim 20, wherein the weight ratio of the amount of $SiO_2$ in the alkali silicate to the hydrophilic metal oxide particles is in the range of 10:1 to 1:4 and the weight ratio of the amount of the first hydrophilic metal oxide particles to the amount of the second hydrophilic metal oxide particles is in the range of 40:1 to 1:4.

23. The coating composition according to claim 20, wherein the weight ratio of the amount of $SiO_2$ in the alkali silicate to the hydrophilic metal oxide particles is in the range of 20:1 to 1:2.

24. The coating composition according to claim 16, wherein the first and/or second hydrophilic metal oxide particles comprise both hydrophilic metal oxide particles having positive charges and hydrophilic metal oxide particles having negative charges.

25. The coating composition according to claim 16, which further comprises at least one member selected from the group consisting of boric acid, boric acid compounds, phosphoric acid, phosphoric acid compounds, and precursors which, upon heat treatment, are converted to $ZrO_2$.

26. A process for producing the hydrophilic material according to claim 1, comprising:

coating the coating composition according to claim 16 onto a substrate to form a hydrophilic layer.

27. A process for producing the hydrophilic material according to claim 1, comprising:

coating the coating composition according to claim 16 onto a substrate to form a first hydrophilic layer; and further coating a solution of an alkali silicate or the coating composition according to claim 16 or 17 onto the first hydrophilic coating to form a second hydrophilic layer.

28. The process according to claim 26, which further comprises the step of heat treating the hydrophilic layer.

29. The process according to claim 28, wherein the hydrophilic layer is heat treated by bringing the surface temperature of the hydrophilic layer to 80 to 500° C.

30. A layer forming apparatus for the formation of a hydrophilic layer to produce the hydrophilic material according to claim 1, comprising:

coating means for coating a hydrophilic coating composition onto a substrate;

coating thickness regulation means for regulating the thickness of the coating of the coating composition; and heating means for heating the coating composition as the coating after the regulation of the coating thickness;

wherein the coating thickness regulation means sprays gas onto the substrate to regulate the coating thickness to a desired value.

31. The layer forming apparatus according to claim 30, wherein the coating thickness regulation means is provided with gas spout means having a spout in the form of a slit parallel to the substrate and gas is ejected through the spout.

32. The layer forming apparatus according to claim 30, which further comprises, provided downstream of the heating means, a cleaning device for cleaning the surface of the hydrophilic layer.

33. The layer forming apparatus according to claim 32, wherein the cleaning device comprises means for cleaning with a cleaning agent and means for removing the cleaning agent.

34. The layer forming apparatus according to claim 33, wherein the means for removing the cleaning agent is of non-contact type.

35. The layer forming apparatus according to claim 30, wherein the heating means applies extreme infrared radiation to perform heating.

36. The layer forming apparatus according to claim 30, which is an apparatus for forming a layer on a surface of a mirror with a protective resin layer provided on the backside thereof.

37. The layer forming apparatus according to claim 30, wherein the heating means comprises means for cooling the backside of the substrate.

38. The layer forming apparatus according to claim 30, which further comprises, provided upstream of the coating means, a cleaning device for cleaning the surface of the substrate.

39. The layer forming apparatus according to claim 38, wherein the cleaning device comprises:

polishing agent supply means for supplying a polishing agent onto the surface of the substrate;

surface polishing means for polishing the surface of the substrate with the polishing agent; and polishing agent removing means for removing the polishing agent after the polishing.

40. The layer forming apparatus according to claim 30, which further comprises, provided downstream of the heating means, a cooling device for cooling the substrate.

41. The layer forming apparatus according to claim 40, wherein the cooling device is disposed between the heating means and the cleaning device.

* * * * *